United States Patent [19]

Prior

[11] 4,298,096

[45] Nov. 3, 1981

[54] CONVERTIBLE TRESTLE LEG ASSEMBLY

[76] Inventor: Herbert E. Prior, P.O. Box 798, Sebastopol, Calif. 95472

[21] Appl. No.: 187,562

[22] Filed: Sep. 15, 1980

[51] Int. Cl.[3] .......... F16M 11/00

[52] U.S. Cl. .......... 182/186; 182/20; 182/226; 182/153; 269/88; 269/296

[58] Field of Search .......... 182/181-186, 182/224-227, 153; 269/88, 296, 906

[56] References Cited

U.S. PATENT DOCUMENTS

| | | | |
|---|---|---|---|
| 787,922 | 4/1905 | Hoxie | 182/186 |
| 2,136,420 | 11/1938 | Edwards | 182/226 |
| 2,198,956 | 4/1940 | Thielepape | 182/181 |
| 2,317,444 | 4/1943 | Dalton | 182/226 |
| 2,478,828 | 8/1949 | Larson | 269/296 |
| 2,644,726 | 7/1953 | Miller | 182/226 |
| 2,814,099 | 11/1957 | Knittel | 269/296 |
| 3,446,312 | 5/1969 | Jones | 182/186 |

*Primary Examiner*—Reinaldo P. Machado
*Attorney, Agent, or Firm*—Melvin R. Stidham

[57] ABSTRACT

A trestle leg assembly comprising a foldable pair of legs which may be opened out and locked into A-frame configuration. Angles are bolted to horizontal plates welded to the tops of the legs, and the bolt holes are located so that when the upright legs of the angles are positioned back to back, they clamp the sides of a standard 2×4, and when they are placed face to face they grip the edges of a 2×4 lying flat.

4 Claims, 5 Drawing Figures

CONVERTIBLE TRESTLE LEG ASSEMBLY

BACKGROUND OF THE INVENTION

In a standard saw horse configuration, a length of standard lumber, such as a 2×4, is positioned on end to span two pairs of legs in A-frame configuration. There are available collapsible legs of steel angles or the like which clamp against the sides of a 2×4 when in use. There are also available similar collapsible legs which grip the edges of a length of standard lumber lying flat to function as a scaffold, work stand or the like. For various uses, it would be convenient to have a stand of this type wherein a length of standard lumber could be gripped to be positioned selectively on its edge or on its side.

OBJECTS OF THE INVENTION

It is an object of this invention to provide a convertible trestle leg which is quickly adjusted to grip a length of standard lumber against its sides or against its short edges.

It is a further object of this invention to provide a pair of leg assemblies which are quickly adjusted to provide, together with a length of 2×4 lumber, a work stand having selectively, either the broad or the narrow side as the work surface.

Other objects and advantages of this invention will become apparent from the description to follow, particularly when read in conjunction with the accompanying drawing.

SUMMARY OF THE INVENTION

In carrying out this invention, I provide a pair of collapsible leg assemblies. Each leg assembly has a pair of legs hinged together at the top and interconnected near their bottoms by a toggle linkage which may be locked to hold the legs apart. Welded to the tops of the legs are flat plates with bolt holes to secure angle members having complementary bolt holes. The angle members may be bolted with their upright legs either in close, back to back position, or spaced face to face position. The bolt holes are located so that when the upright legs are back to back, they are spaced approximately $1\frac{5}{8}$ inches apart to grip the sides of a standard 2×4. When bolted into spaced, face to face relationship, they are spaced apart approximately $3\frac{5}{8}$ inches to grip the short edges of a 2×4 lying on its side. Holes in the upright legs have their edges punched out to dig into the wood being gripped.

DESCRIPTION OF A PREFERRED EMBODIMENT

Figures 1, 2, 3, 4, 5:
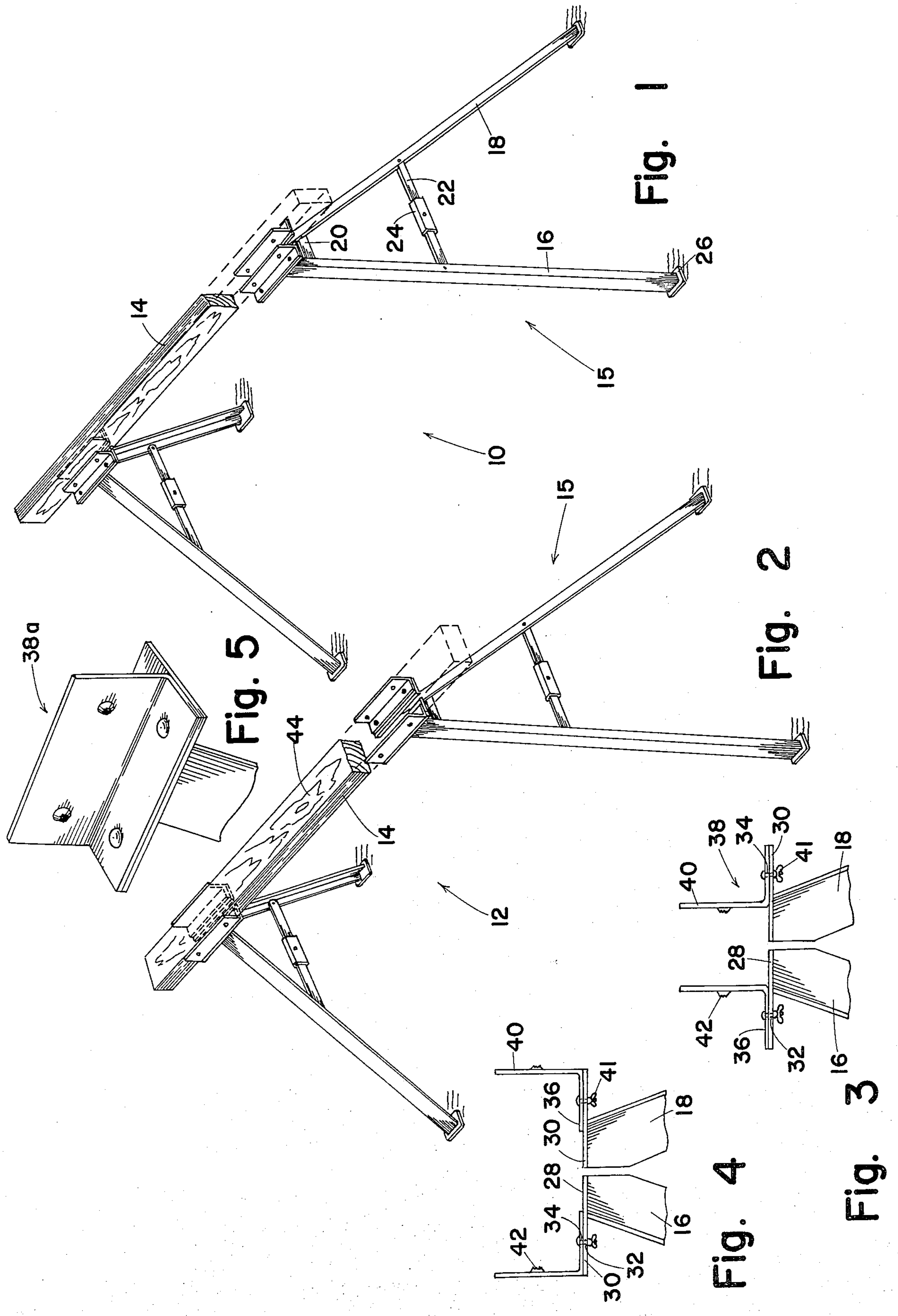
FIG. 1 is a view in perspective of a pair of trestle support legs of this invention gripping a length of standard lumber supported on its edge.
FIG. 2 is a view in perspective of the trestle supports gripping the lumber supported on its side.
FIGS. 3 and 4 are partial end views showing the angle gripping jaws in their two alternative positions.
FIG. 5 is an enlarged partial view in perspective of the wood clamping members.

Looking at the drawings with greater particularity, the saw horse or work supports 10 (FIG. 1) and 12 (FIG. 2) comprise a length of standard lumber 14 supported on a collapsible steel support 15 of this invention. Each support 14 includes a pair of legs 16 and 18, which are linked together at 20 at their upper ends. The legs are interconnected intermediate their lengths by a toggle linkage 22 having an over-center locking device 24 which holds the legs 16 and 18 separated in working position. Feet 26 are welded to the bottom of the legs 16 and 18 to prevent penetration into a surface on which they may be supported.

Welded to the tops of the legs 16 and 18 are horizontal, steel support plates 28 and 30 provided with bolt holes 32. Complementary bolt holes 34 are provided in the horizontal legs 36 of angles 38 having upright clamping legs 40. Preferably holes 42 are punched into the upright legs 40 for penetration into the wood 14 clamped between them.

The bolt holes 32 and 34 are so disposed so that when secured by bolts 41 in back to back relation as in FIG. 3, they are spaced apart substantially the thickness of a standard length of lumber, e.g. a 2×4 and if bolted with their upright legs 40 in spaced, face to face relationship, they grip the edges of the lumber 14 lying flat. The embossing around the interlock holes 42 may be made to face in opposite directions in each upright leg, so that no matter how turned, at least one embossment will be effective. With the plate bolt holes 32 spaced $2\frac{3}{4}$ inches apart and the centerline of the bolt hole 34 spaced 9/16 inches from the edge of a horizontal leg one inch wide and $\frac{1}{8}$ inch thick, the vertical legs 40, when disposed in back to back relationship as in FIG. 3, will be 1 and $\frac{5}{8}$ inches apart, Then, when turned and bolted in face to face relationship, as in FIG. 4, each vertical leg will be moved one inch back to bring them a total of 3 and $\frac{5}{8}$ inches apart, in position to clamp the narrow edges of a 2×4, as in FIG. 2.

Preferably, the vertical legs 40 are only approximately 1 and $\frac{1}{2}$ inches in height, so as to grip the 2×4 edges as in FIG. 2, without protruding above the upper work surface 44.

While this invention has been described in conjunction with a preferred embodiment thereof, it is obvious that modifications and changes therein may be made by those skilled in the art to which it pertains, without departing from the spirit and scope of this invention, as defined by the claims appended hereto.

What is claimed as invention is:

1. In a trestle leg assembly comprising:

a pair of legs of steel shapes pivoted together at their upper ends, and means including toggle links interconnecting said legs for separating the lower ends of said legs and locking them in separated position;

the improvement comprising:

base plates secured to the upper ends of said legs;

a pair of angle members; and complementary bolt holes in a horizontal leg of each of said angle members and in each of said base plates;

bolt means for releasably securing one of said angle members to each of said base plates;

said bolt holes being so positioned that when the vertical legs of said angle members are disposed in inboard, back to back positions the space between them is substantially equal to the standard thickness of a length of lumber and when disposed in outboard, face to face positions they will be spaced apart by substantially the width of said lumber.

2. The trestle leg improvement defined by claim 1 wherein:

when said other legs are in said inboard positions they are substantially 1 and $\frac{5}{8}$ inches apart, and when in said outboard positions they are substantially 3 and $\frac{5}{8}$ inches apart.

3. The trestle leg improvement defined by claim 1 including:

at least one hole in each of said vertical legs;

the metal around each of said holes being embossed to form protruding lips therearound.

4. The trestle leg improvement defined by claim 3 wherein:

the lip around a hole in one of said vertical legs protrude outward and the lip around a hole in the other of said vertical legs protrude inward.

* * * * *